United States Patent [19]

Vieglins

[11] Patent Number: 4,541,600
[45] Date of Patent: Sep. 17, 1985

[54] BRACKET OR SUPPORT, PARTICULARLY FOR SHELF FRAMEWORKS

[75] Inventor: Dzintars Vieglins, Taberg, Sweden

[73] Assignee: Skillmech AB, Skillingaryd, Sweden

[21] Appl. No.: 526,042

[22] Filed: Aug. 24, 1983

[30] Foreign Application Priority Data

Aug. 31, 1982 [SE] Sweden ................. 8204962

[51] Int. Cl.⁴ ............................................. A47B 47/00
[52] U.S. Cl. ................................. 248/239; 211/186; 403/234
[58] Field of Search ............ 248/235, 229, 231.1, 248/239; 211/186, 187; 108/111; 403/233, 234, 235, 237, 191

[56] References Cited

U.S. PATENT DOCUMENTS

| | | | |
|---|---|---|---|
| 1,767,316 | 6/1930 | Sealey | 248/239 |
| 2,896,897 | 7/1959 | Schlueter | 248/239 |
| 4,386,870 | 6/1983 | Baroody | 403/234 |
| 4,444,321 | 4/1984 | Carlstrom | 248/239 |

FOREIGN PATENT DOCUMENTS 506347 10/1954 Canada ................. 248/239

Primary Examiner—Reinaldo P. Machado
Assistant Examiner—Alvin Chin-Shue
Attorney, Agent, or Firm—Cohen, Pontani & Lieberman

[57] ABSTRACT

A bracket, particularly for interconnecting a shelf and a gable comprises a transverse channel for the shelf and a through aperture, which opens into said channel, for a screw by means of which the shelf is intended to be connected to the gable. To reduce the strain on the transverse end edges of the shelf when it is subjected to forces in its longitudinal direction the extension of the bracket, when measured perpendicularly to the shelf, is at least two and preferably more than three times as great as the thickness of the shelf. On that side of the bracket which in the operative position of the bracket is turned away from the shelf and faces the gable, the bracket has a preferably central recess for restricting the engagement between the bracket and the gable to those marginal portions of the bracket which are located farthest away from the shelf.

1 Claim, 5 Drawing Figures

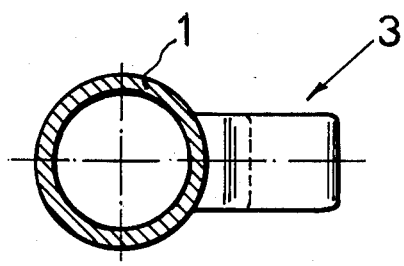
FIG.3
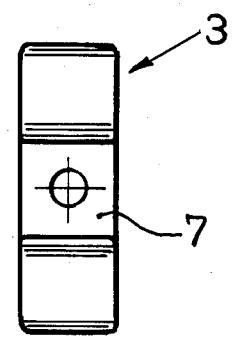
FIG.4
FIG.5
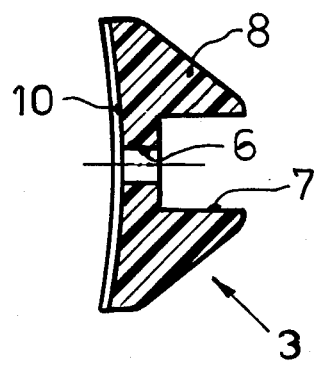

BRACKET OR SUPPORT, PARTICULARLY FOR SHELF FRAMEWORKS

BACKGROUND OF THE INVENTION

This invention relates to a bracket or support, particularly for shelf frameworks or the like.

SUMMARY OF THE INVENTION

Frameworks or structures of this kind, for which the bracket is intended in the first instance, comprise two metal tube gables, each having the shape of an inverted U and standing on a floor or another base with the shanks of the U turned downwards. These gables carry together shelves which usually are of wood or the like and have their ends screwed to the two shanks of a respective U-gable. The screws are preferably threaded into studs or the like which are provided with threaded screw holes and are inserted into the ends of the shelves cooperating with gables for strengthening the screw joint.

Shelf frameworks of the kind in question are comparatively stable in a direction which coincides with the planes of the gables but instable in a direction perpendicular hereto. The lastmentioned property is due to the fact that the ends of the shelves abut the tube shanks only along a short stretch which corresponds to the thickness of the shelf (about 16–20 mm) and with a contact surface which is usually almost linear, since the gable tubes generally have a circular cross section. When the shelf framework is subjected to pressure, shocks or the like which give rise to a force which is parallel to the longitudinal direction of the shelves, the load or strain upon the transverse end edges of the shelves becomes great due to the fact that the vertical torque arm from screw to end edge is short. This entails damages upon the screw joints between the gables and the shelves, so that the shelf framework may collapse in the worst instance.

The principal object of the invention is to eliminate the above drawback and to provide a shelf framework of the above kind which is stable in all directions.

According to the invention this object is attained through the connection of the shelves with their gables by means of brackets or supports constructed in accordance with the characterizing clause of the claim.

BRIEF DESCRIPTION OF THE DRAWINGS

Further features and advantages of the bracket or support according to the invention will become apparent from the following detailed description and the annexed drawings which diagrammatically and as non-limiting examples illustrate two preferred embodiments of the invention.

FIG. 3 is a plan view of a bracket or support abutting or engaging a tube comprised in the framework as well as said tube as seen in a cross section on line III—III in FIG. 2, screw and shelf having been omitted.

FIG. 4 is a side view of the bracket according to FIGS. 2 and 3 alone.

FIG. 5 is a cross sectional view, corresponding to FIG. 2, of a modified bracket.

DESCRIPTION OF THE PREFERRED EMBODIMENT

Figure 1:
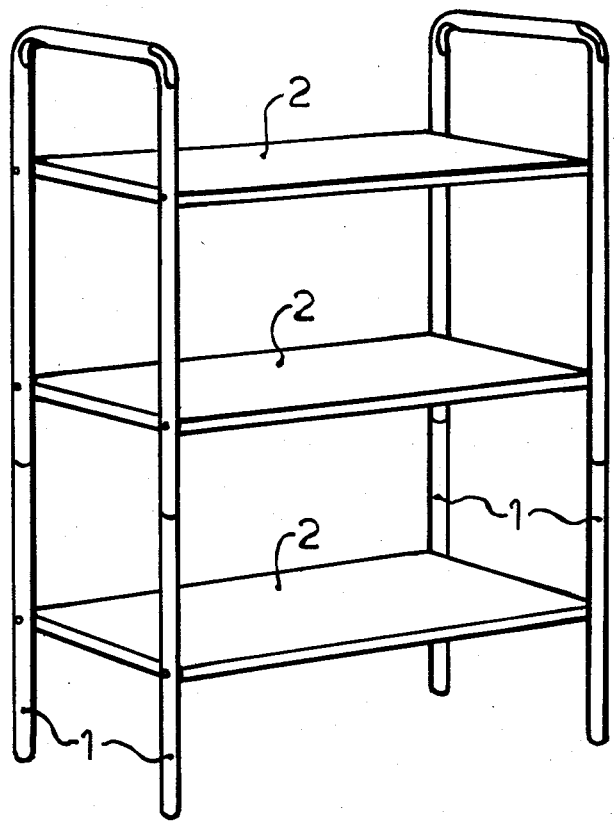
FIG. 1 is a simplified perspective view of a known shelf framework for which the bracket in accordance with the invention is primarily intended.

The shelf framework according to FIG. 1 comprises two gables each consisting of a metal tube 1 which is bent into U-form and whose downwards directed shanks are intended to rest upon a floor or another base surface, and a number of shelves 2, which are supported by the gables 1 with which the transverse end edges of the shelves are connected by means of screws.

According to the invention the shelves 2 are united with the gables 1 under the intermediary of special brackets or supports which are shown in FIGS. 2–5 and are generally designated 3. In these Figures the scale is smaller than it is in FIG. 1.

Figure 2:
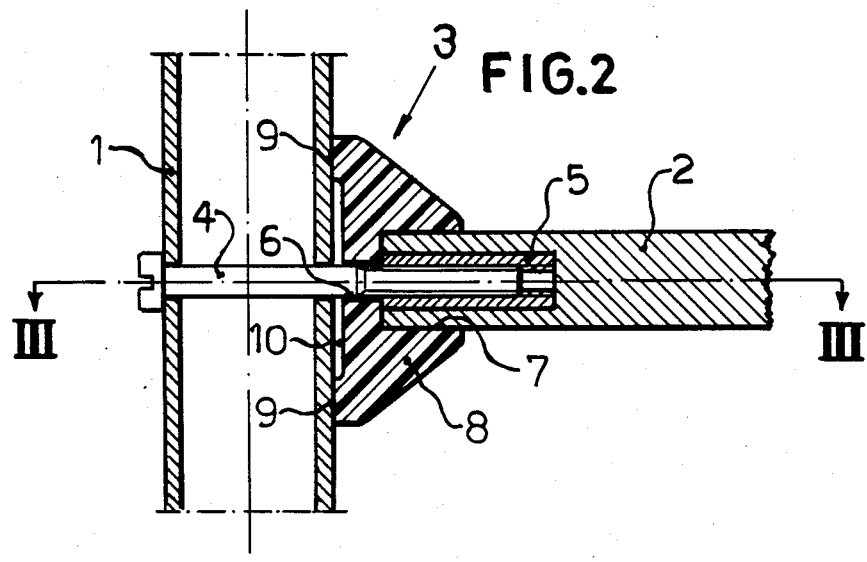
FIG. 2 is a simplified vertical sectional view of a bracket and part of a gable and a shelf which are interconnected by means of the bracket.

In FIG. 2 4 designates a bolt or screw which passes through the tube 1 and the bracket 3 and is screwed into a threaded bore in a metal sleeve or bushing 5 inserted into a hole in the shelf. This sleeve which is not affected by the invention may possibly be omitted or replaced by a metal stud which is introduced into a hole in the shelf 2 extending perpendicularly to the axis of the screw and having a diametrically extending, through, threaded bore into which the screw 4 is screwed and firmly tightened.

The bracket or support 3 according to the invention is made of an elastically deformable material, preferably plastics, or a (light) metal (alloy), and may be manufactured by compression moulding, injection moulding, die casting, extrusion or the like. The bracket 3 has a through hole 6 for the screw 4 and a transverse channel or groove 7, which is horizontal in the operative position, for the end edge of the shelf 2.

The abutment surface of the bracket 3 contacting the tube 1 has a considerable extension in the vertical or height direction and is at least two and preferably more than three times longer than the thickness of the shelf 2.

In accordance with the invention the bracket or support 3 has that one of its sides which faces the gable or framework 1 and is turned away from the shelf 2 provided with a central recess for restricting the engagement or contact between the bracket 3 and the gable 1 to the end or marginal portions 9 of the bracket which are located farthest away from the shelf. Furthermore, the bracket is elastic for improving the engagement between said end portions 9 and the gable 1 and creating a clamping action between the channel 7 and the shelf member 2. At least these upper and the lower marginal portions 9 of the abutment surface of the bracket are preferably arcuate or bent on an axis which is parallel to the longitudinal direction of the contact or abutment surface when the mode of manufacture so permits. In the unloaded condition of the bracket the radius of curvature of said surfaces is preferably made so much less than the radius of the tube 1 that said marginal portions 9 in their entirety contact the circumferential surface of the tube 1 when the bolt or screw 4 is fully tightened.

The embodiment according to FIG. 5 in which the same reference numerals as in FIG. 2 are used to designate same or similar portions of the bracket or support 3, deviates from that described above essentially in respect of the shape of the recess or inward bend which according to FIG. 5 has been given a substantially triangular (instead of rectangular) form as seen in a longitudinal cross section through the bracket.

As has been pointed out above the bracket or support according to the invention stabilizes a shelf framework or structure to a remarkably high extent due to the fact that those portions of the bracket 3 which are located on opposite sides of the channel 7 enclose the shelf 2 in a firm grip like a pair of jaws. Thanks to the bracket according to the invention the need for cross or diagonal stays interconnecting the gables 1 and secured thereto on different levels is eliminated.

The embodiments described above and illustrated in the drawing are, of course, to be regarded merely as non-limiting examples and may with respect to shape and details be modified in several respects within the scope of the following claims. For example, each gable may be comprised e.g. of a pair of tubes or one single, solid panel.

What I claim is:

1. A bracket for connecting a shelf with an appurtenant gable or framework, said bracket having a channel for receiving said shelf and a through aperture opening into the bottom of said channel for a screw or bolt to be threaded into one end of said shelf for connecting the shelf with said gable, said bracket having one side which confronts the gable wherein said one side of said bracket is provided with a central recess to define a pair of marginal portions of said side, said side of said bracket and said gable being in engagement with one another, the portion of said side in engagement with said gable being limited to said marginal portions thereof, said bracket being elastic for improving the engagement between said marginal portions and said gable and for exerting a clamping force by said channel on the shelf received therewithin when said screw or bolt is tightened.

* * * * *